(12) United States Patent
Almadhoun et al.

(10) Patent No.: US 8,878,341 B2
(45) Date of Patent: Nov. 4, 2014

(54) GRAPHENE-BASED COMPOSITE MATERIALS, METHOD OF MANUFACTURE AND APPLICATIONS THEREOF

(71) Applicant: Saudi Basic Industries Corporation, Riyadh (SA)

(72) Inventors: Mahmoud N. Almadhoun, Thuwal (SA); Husam N. Alshareef, Thuwal (SA); Unnat S. Bhansali, Thuwal (SA); Prince Xavier, Thuwal (SA); Ihab N. Odeh, Thuwal (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 14/048,333

(22) Filed: Oct. 8, 2013

(65) Prior Publication Data

US 2014/0098458 A1   Apr. 10, 2014

Related U.S. Application Data

(60) Provisional application No. 61/711,279, filed on Oct. 9, 2012.

(51) Int. Cl.
| | | |
|---|---|---|
| *H01L 21/02* | (2006.01) | |
| *H01L 49/02* | (2006.01) | |
| *C07D 301/36* | (2006.01) | |
| *H01G 4/14* | (2006.01) | |
| *C08K 3/04* | (2006.01) | |
| *C08K 9/02* | (2006.01) | |

(52) U.S. Cl.
   CPC .............. *H01G 4/14* (2013.01); *C08L 2666/55* (2013.01); *C08K 3/04* (2013.01); *C08L 2203/20* (2013.01); *C08K 9/02* (2013.01); *Y10S 977/779* (2013.01)
   USPC ........... 257/532; 438/396; 106/316; 977/779; 257/410

(58) Field of Classification Search
   USPC ............ 257/532; 438/396; 977/779; 106/316
   See application file for complete search history.

(56) References Cited

U.S. PATENT DOCUMENTS

| | | | |
|---|---|---|---|
| 2010/0239871 A1* | 9/2010 | Scheffer et al. | 428/447 |
| 2011/0079748 A1* | 4/2011 | Ruoff et al. | 252/62.2 |
| 2011/0084252 A1 | 4/2011 | Wu et al. | |
| 2011/0086206 A1* | 4/2011 | Scheffer et al. | 428/195.1 |
| 2011/0133134 A1* | 6/2011 | Varma et al. | 252/511 |
| 2011/0286147 A1 | 11/2011 | Chen et al. | |

(Continued)

FOREIGN PATENT DOCUMENTS

EP         2518103 A2    10/2012

OTHER PUBLICATIONS

Avinash et al.; "Covalent modification and exfoliation of graphene oxide using ferrocene"; Nanoscale 2(9); pp. 1762-1766; 2010.

(Continued)

*Primary Examiner* — Evan Pert
(74) *Attorney, Agent, or Firm* — Cantor Colburn LLP

(57) ABSTRACT

Disclosed herein is a composite material comprising a relaxor ferroelectric material and a hydrazine-reduced graphene oxide, wherein the weight ratio of the composite material to the hydrazine-reduced graphene oxide is 9:1 to 200:1. The composite materials have high dielectric permittivity and low dielectric losses and can be used to manufacture various high dielectric permittivity components.

20 Claims, 9 Drawing Sheets

(56) References Cited

U.S. PATENT DOCUMENTS

| | | | | |
|---|---|---|---|---|
| 2012/0116094 A1* | 5/2012 | Swager et al. | ............... | 548/256 |
| 2012/0142832 A1* | 6/2012 | Varma et al. | ............... | 524/145 |
| 2012/0261612 A1 | 10/2012 | Suh et al. | | |
| 2012/0277360 A1* | 11/2012 | Scheffer et al. | ............... | 524/237 |

OTHER PUBLICATIONS

Bai et al.; "Functional Composite Materials Based on Chemically Converted Graphene"; Advanced Materials; 23; pp. 1089-1115; 2011.

Cui et al.; "Graphene-based composite materials with high dielectric permittivity via an in situ reduction method"; Phys. Status Solidi A 208; No. 2; pp. 459-461; 2011.

Dang et al.; "Giant Dielectric Permittivities in Functionalized Carbon-Nanotube/Electroactive-Polymer Nanocomposites"; Advanced Materials; 2007; 19; pp. 852-857.

He et al.; "High Dielectric Permittivity and Low Percolation Threshold in Nanocomposites Based on Poly(vinylidene fluoride) and Exfoliated Graphite Nanoplates"; Advanced Materials; 2009; 21; pp. 710-715.

Javadi et al.; "Chemically modified graphene/P(VDF-TrFe-CFE) electroactive polymer nanocomposites with superior electromechanical performance"; Journal of Materials Chemistry; 2012; 22; pp. 830-834.

Li et al.; "Review on polymer/graphite nanoplatelet nanocomposites"; Journal of Materials Chemistry; 46; pp. 5595-5614; 2011.

Park et al.; "Chemical structures of hydrazine-treated graphene oxide and generation of aromatic nitrogen doping"; Nature Communications; pp. 1-8; 2012.

Ramanathan et al.; "Functional graphene sheets for polymer nanocomposites"; Nature Nanotechnology; pp. 327-331; 2008.

Tang et al.; "Highly Efficient Synthesis of Graphene Nanocomposites"; American Chemical Society; 2012; 12; pp. 84-90.

Terrones et al.; "Interphases in Graphene Polymer-based Nanocomposites: Achievements and Challenges"; Advanced Materials; 23; pp. 5302-5310; 2011.

Wan et al.; "Graphene nanosheets based on controlled exfoliation process for enhanced lithium storage in lithium-ion battery"; Diamond & Related Materials; 20; pp. 756-761; 2011.

Wang et al.; "High-dielectric constant percolative composite of P(VDF-TrFE) and modified multi-walled carbon-nanotubes"; Polym. Bull.; 2012; 68:2285-2297.

Wang et al.; "Dielectric properties of reduced graphene oxide/polyporpylene composites with ultralow percolation threshold"; Polymer; 54; pp. 1916-1922; 2013.

Wang et al.; "Graphene Oxide Filled Nanocomposite with Novel Electrical and Dielectric Properties"; Advanced Materials; 24; pp. 3134-3137; 2012.

Wu et al.; "Morphology-controllable graphene-TiO2 nanorod hybrid nanostructures for polymer composites with high dielectric performance"; Journal of Materials Chemistry; 21; pp. 17729-17736; 2011.

Zhang et al.; "A novel approach for transferring water-dispersible graphene nanosheets into organic media"; Journal of Materials Chemistry; 22; pp. 11748-11754; 2012.

Zhou et al.; "Surface-Functionalized MWNTs with Emeraldine Base: Preparation and Improving Dielectric Properties of Polymer Nanocomposites"; American Chemical Society; 2011; 4 pages.

Zhou et al.; "Preparation of graphene-TiO2 composites with enhanced photocatalytic activity"; New Journal of Chemistry; 35; pp. 353-359; 2011.

CN 102492296 A; English Abstract; Date of Publication Jun. 13, 2012; 2 pages.

CN 102558857 A; English Abstract; Date of Publication Jul. 11, 2012; 2 pages.

International Search Report for International Application No. PCT/US2013/063850; International Filing Date: Oct. 8, 2013; Date of Mailing Jan. 14, 2014; 4 pages.

Shang et al.; "Fabrication and dielectric properties of oriented polyvinylidene fluoride nanocomposites incorporated with graphene nanosheets"; Materials Chemistry and Physics; 134; pp. 867-874; 2012.

Sun et al.; "A simple and controllable nanostructure comprising non-conductive poly(vinylidene fluoride) and graphene nanosheets for supercapacitor"; Front. Mater. Sci.; 6(2); pp. 149-159; 2012.

* cited by examiner

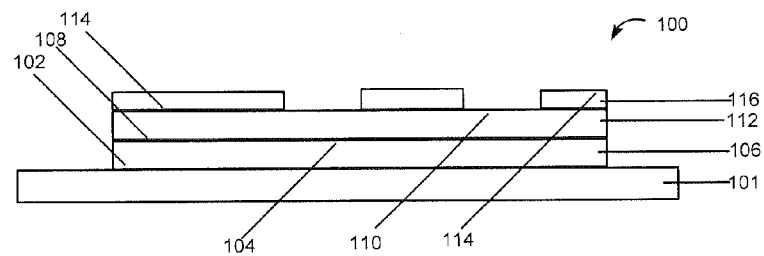
FIG. 1A
FIG. 1B
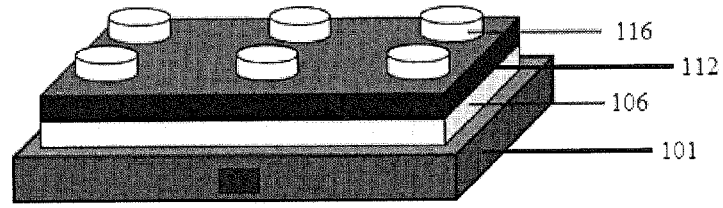
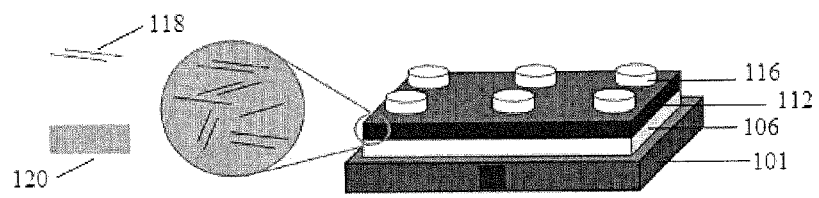
FIG. 1C
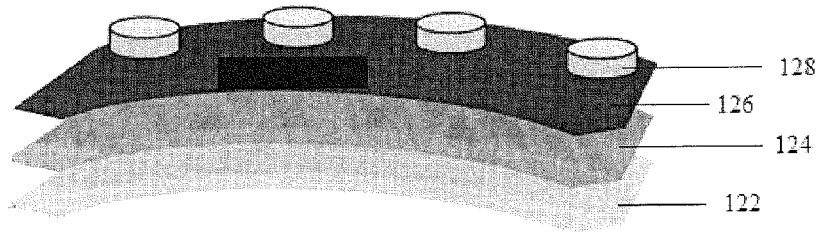
FIG. 2

US 8,878,341 B2

GRAPHENE-BASED COMPOSITE MATERIALS, METHOD OF MANUFACTURE AND APPLICATIONS THEREOF

CROSS-REFERENCE TO RELATED APPLICATION

This application claims the benefit of U.S. Provisional Application No. 61/711,279 filed Oct. 9, 2012, which is hereby incorporated by reference in its entirety.

BACKGROUND OF THE INVENTION

This disclosure relates generally to graphene-based composite materials, and more particularly, to reduced graphene oxide composite materials and their methods of manufacture. This disclosure also relates to the application of the composite materials in electronic devices.

Polymeric materials have great potential for application in electric capacitors, piezoelectric devices, optical modulators, storage media, memory devices, and the like. Unfortunately, the dielectric permittivity of polymer materials is typically less than desirable; and in order to realize the potentials of polymer materials, it is necessary to substantially improve their dielectric permittivity.

One way to improve the dielectric permittivity of polymer materials is to introduce ceramics of high dielectric permittivity as fillers into the polymer matrix of the polymer materials. However, the improvement on dielectric permittivity is limited even with high filler loadings. In addition, the mechanical properties of the polymer materials such as flexibility can be compromised with the use of ceramic fillers.

Incorporation of conductive metal nanoparticles such as Ag, Al, Ni, Cu, or Au, conductive polymers such as polyaniline, and oligomers such as copper phthalocyanine in polymer materials results in composites having a range of dielectric permittivity. The major drawback of such composite systems is that the dielectric losses also significantly increase due to insulator-conductor transition near the percolation threshold. The significant dielectric losses limit the use of such composite materials in practical applications. Additionally, the improvement of dielectric permittivity of the reported systems sometimes is still less than desirable. Accordingly, there remains a need for composite materials having high dielectric permittivity and low dielectric losses at the same time.

SUMMARY OF THE INVENTION

In an aspect, disclosed herein is a composite material comprising a relaxor ferroelectric material; and a hydrazine-reduced graphene oxide (HZ-rGO). In an embodiment, a composite material comprises a relaxor ferroelectric material comprising poly(vinylidenefluoride-co-trifluoroethylene-co-chlorofluoroethylene); and a hydrazine monohydrate reduced graphene oxide, wherein the weight ratio of the relaxor ferroelectric material to the hydrazine monohydrate reduced graphene oxide is 9:1 to 200:1.

The composite material can be prepared by contacting a hydrazine-reduced graphene oxide with a relaxor ferroelectric material in the presence of a solvent; or by contacting graphene oxide with a relaxor ferroelectric material in the presence of a solvent; and reducing graphene oxide with hydrazine.

In another aspect, disclosed herein is a capacitor comprising a substrate; a first electrode disposed on the substrate; a dielectric layer disposed on and in contact with the first electrode; and a second electrode disposed on and in contact with the dielectric layer, wherein the dielectric layer comprises a composite material comprising a relaxor ferroelectric material; and a hydrazine-reduced graphene oxide.

Specifically, in an embodiment, a capacitor device can comprise: a substrate; a first electrode disposed on the substrate; a dielectric layer disposed on and in contact with the first electrode; and a second electrode disposed on and in contact with the dielectric layer, wherein the dielectric layer comprises a composite material comprising a relaxor ferroelectric material comprising poly(vinylidenefluoride-co-trifluoroethylene-co-chlorofluoroethylene); and a hydrazine monohydrate reduced graphene oxide, wherein the weight ratio of the relaxor ferroelectric material to the hydrazine monohydrate reduced graphene oxide is 9:1 to 200:1.

The method of making the capacitor device comprises disposing a first electrode on a substrate; disposing a dielectric layer on the first electrode; and disposing a second electrode on the dielectric layer, wherein the dielectric layer comprises a composite material comprising a relaxor ferroelectric material; and a hydrazine-reduced graphene oxide.

In yet another aspect, disclosed herein is an electric component comprising an interconnect that electrically connects at least two elements of the electrical component, wherein the elements of the electrical component comprises or in contact with a dielectric layer comprising a composite material, wherein the composite materials comprises a relaxor ferroelectric material and a hydrazine-reduced graphene oxide.

BRIEF DESCRIPTION OF THE DRAWINGS

The following Figures are exemplary embodiments, wherein like elements are numbered alike and in which:

FIGS. 1A, 1B, and 1C show a capacitor having a dielectric layer disposed between bottom and top electrodes;

FIG. 2 shows an all-organic capacitor device;

DETAILED DESCRIPTION OF THE INVENTION

Figure 3:
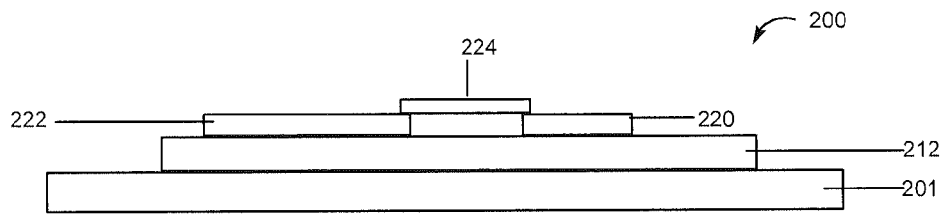
FIG. 3 shows an embodiment of an electric component with an organic interconnect.

The inventors hereof have found that incorporating hydrazine-reduced graphene oxide into relaxor ferroelectric materials, such as poly(vinylidenefluoride-co-trifluoroethylene-co-chlorofluoroethylene) in low loadings, can produce high performance composite materials with giant dielectric permittivity, low dielectric losses, and low percolation threshold. This result is surprising because the use of graphene nanoplatelets and hydrothermal reduced graphene oxide either does not significantly improve the dielectric permittivity or improves the dielectric permittivity at the expense of significant dielectric losses. Accordingly, in a specific embodiment, this disclosure is directed to graphene-based nanocomposites with giant dielectric permittivity, low dielectric loss, and low percolation threshold.

The graphene-based nanocomposites are useful in the manufacture of various electric devices such as high charge storage capacitors. In particular, these composite materials are useful in the manufacture of electric devices fabricated on organic polymer substrates, as they advantageously allow processing at low temperatures.

Generally, the composite materials comprise a relaxor ferroelectric material and a hydrazine-reduced graphene oxide (HZ-rGO). The weight ratio of the relaxor ferroelectric material and the hydrazine-reduced graphene oxide varies depending on the specific polymer material used, including the particle size of the material, and can be 9:1 to 200:1, preferably 35:1 to 100:1, and more preferably 40:1 to 60:1.

Advantageously, the composite materials are nanocomposites. As used herein "nanocomposites" refer to a polymeric material, advantageously a ferroelectric polymer or copolymer, having dispersed therein a plurality of the hydrazine-reduced graphene oxide nanoparticles, the particles having a thickness of less than 250 nanometers (nm), preferably less than 100 nm, for example from 1 nm to 250 nm or 1 nm to 100 nm. Graphene lateral particle dimension is less than 500 micrometers (μm), preferably less than 100 μm, for example 10 μm to 25 μm.

The hydrazine-reduced graphene oxide can be synthesized from natural graphite. Natural graphite is first oxidized to graphite oxide, for example according to the method described in Hummers W., and Offeman R., Preparation of Graphitic Oxide, Journal of the American Chemical Society, volume 80, p. 1339 (1958), or a modification thereof For example, concentrated sulfuric acid can be added to graphite powder and sodium nitrate. Then the mixture is cooled in an ice batch before potassium permanganate is added. After the ice bath was removed, the reaction is conducted at room temperature. Water can be added to the crude reaction product followed by hydrogen peroxide. The formed suspension can then be centrifuged, filtered, washed and dried to provide graphite oxide.

The graphite oxide can then be exfoliated and reduced to produce hydrazine-reduced graphene oxide. For example, graphene oxide (GO) can be suspended in a solvent such as water, optionally in the presence of sonication. Hydrazine, for example hydrazine monohydrate, can be added to the suspension. The mixture is stirred at an elevated temperature for a period of time, for example at 30-200° C., preferably 50-100° C., more preferably 70-90° C. for 30 minutes to 36 hours, preferably 5 to 24 hours, more preferably 10 to 15 hours. Reduced graphene oxide precipitates as black powder, which can subsequently be filtered and dried. S. Park et al. describes one method to prepare hydrazine-reduced graphene oxide in Carbon, volume 49, pp. 3019-3023 (2011). The prepared HZ-rGO can be combined with a composite matrix material, for example a polymeric matrix material, to provide the composite material.

The composite matrix is a relaxor ferroelectric material. As is known in the art, relaxor ferroelectric materials are a class of ferroelectric materials that do not retain a high remnant polarization at zero electric field due to presence of polar nanodomains, typically shown by a slim polarization hysteresis loop. This enables them to charge and discharge more energy density while maintaining a low hysteresis loss. The material can be inorganic, for example, barium titanate ($BaTiO_3$), lead titanate ($PbTiO_3$), lead zirconate titanate (PZT), lead lanthanum zirconate titanate (PLZT), lead magnesium niobate (PMN), potassium niobate ($KNbO_3$), potassium sodium niobate ($K_xNa_{1-x}NbO_3$), potassium tantalate niobate ($K(Ta_xNb_{1-x})O_3$), and bismuth titanate ($Bi_4Ti_3O_{12}$). Advantageously, the composite matrix material is organic, for example fluorinated polymer or oligomer. Such homopolymers and copolymers can comprise, for example, fluorinated units of the formulas —$(CH_2-CF_2)_n$—, —$(CHF-CF_2)_n$—, or —$(CF_2-CF_2)_m$— to provide homopolymers, or combinations thereof to provide copolymers such as —$(CH_2-CF_2)_n$—$(CHF-CF_2)_m$— or —$(CH_2-CF_2)_n$—$(CF_2-CF_2)_m$—. Polyvinylidene fluoride homopolymers (PVDF, —$(CH_2-CF_2)_n$—), poly(vinylidene fluoride-co-trifluoroethylene) copolymers (P(VDF-TrFE)), and poly(vinylidenefluoride-co-trifluoroethylene-co-chlorofluoroethylene) (P(VDF-TrFE-CFE)) can be used. Other possible polymers include odd-numbered nylons, cyanopolymers, poly(urea)s, and poly(thioureas)s.

The composite materials can be made by contacting hydrazine-reduced graphene oxide with a polymer material in the presence of a solvent. Optionally, the combination can be sonicated to facilitate the dispersion of HZ-rGO in the polymeric material. In some embodiments, HZ-rGO is dispersed in a solvent optionally in the presence of sonication. The polymer material can be independently dissolved or dispersed in a solvent at room or an elevated temperature before added to the HZ-rGO suspension.

The solvent used to prepare the composite materials are not particularly limited and any solvent that dissolves the particular polymeric material can be used. Exemplary solvents include dimethylformamide (DMF), methyl ethyl ketone (MEK), dimethyl acetamide, tetramethyl urea, dimethyl sulfoxide, triethyl phosphate, N-methyl-2-pyrrolidone. After HZ-rGO is dispersed in the polymeric material, it can be casted directly on electrodes or substrates to make electronic devices. Alternatively, solvent can be removed to provide composite materials that can be stored for later use.

Alternatively, the composite materials can be produced by combining graphene oxide with a polymer material as described above and a solvent as described above, optionally using sonication. Then hydrazine, such as hydrazine monohydrate, can be added to provide the composite material containing hydrazine-reduced graphene oxide and the polymer material to produce the HZ-rGO.

The composite materials of the disclosure have high dielectric permittivity and low dielectric losses and can be used to manufacture capacitor devices.

Capacitor devices comprise a substrate, a first electrode disposed on the substrate; a dielectric layer disposed on and in contact with the first electrode; and a second electrode disposed on and in contact with the dielectric layer, wherein the dielectric layer comprises the composite material of this disclosure.

Any substrate can be used in the dielectric device, including silicon, glass, quartz, fused silica, and the like. In an embodiment, the substrate is flexible. Flexible substrates generally include polymers, both natural (e.g., paper or cloth) and synthetic, in particular thermoplastic polymers such as poly(carbonate), poly(ester)s such as poly(ethylene terephthalate), poly(ethylene naphthalate), poly(ether ether ketone), poly(ethersulfone), poly(etherimide), poly(imide), poly(norbornene), copolymers of the foregoing polymers, and the like. The substrate can be transparent and/or flexible. A specific substrate is poly(etherimide), for example the poly(etherimide)s from Sabic Innovative Plastics under the trade name ULTEM®.

The electrode can be organic or inorganic. Exemplary inorganic electrodes include copper, silver, gold, titanium, platinum, palladium, and alloys containing at least one of the above-mentioned metals, zinc oxide, and indium tin oxide. Organic electrode comprises a doped electroconductive organic polymer, which comprises an intrinsically conductive organic polymer and a dopant that increases the electrical conductivity of the intrinsically conductive organic polymer. Any intrinsically conductive organic polymer can be used, provided that it can be doped to provide the desired conductivity, and has other properties suitable for use in electronic devices. "Intrinsically conductive organic polymers" as used herein include electrically conducting or semiconducting polymers. Such polymers generally have (poly)-conjugated π-electron systems (e.g., double bonds, aromatic or hetero aromatic rings, or triple bonds) with conductive properties that are not influenced by environmental factors such as relative humidity. Useful intrinsically conductive organic polymers can have a resistivity of $10^7$ ohm-cm or less, $10^6$ ohm-cm or less, or $10^5$ ohm-cm or less. Intrinsically conductive organic polymers containing all-carbon aromatic rings can be, for example, poly(phenylene), poly(naphthalene), poly(azulene), poly(fluorene), poly(pyrene), or their copolymers. Intrinsically conductive organic polymers with a nitrogen-containing aromatic ring can be, for example, poly(pyrrole), poly(carbazole), poly(indole), poly(azepine), or their copolymers. Intrinsically conductive organic polymers with a sulfur-containing aromatic ring can be, for example, poly(thiophene), poly(3,4-ethylenedioxythiophene), or their copolymers. Other intrinsically conductive organic polymers can be, for example, poly(aniline) (PANT), poly(p-phenylene-sulfide), poly(acetylene), poly(p-phenylene vinylene), or their copolymers. Combinations comprising any one or more of the foregoing intrinsically conductive organic polymers can be used. For example, the intrinsically conductive organic polymer used in the capacitor devices can be poly(3,4-ethylenedioxythiophene)-poly(styrenesulfonate) (PEDOT-PSS) with a resistivity below $1 \times 10^2$ ohm-cm at 100 nm layer thickness.

To increase the conductivity of the intrinsically conductive organic polymers, the polymers are doped with a doping material ("dopant") that provides an increase in conductivity that is equal to or greater than three orders of magnitude relative to the conductivity of the undoped intrinsically conductive organic polymer. It has unexpectedly been found that doping the polymer improves the conductivity sufficiently for the devices to have performance properties similar to that of devices containing metal conductors, e.g., platinum or gold.

Generally, doping materials can be any organic compound effective to increase the conductivity of the intrinsically conductive organic polymer to the desired degree without significantly adversely affecting the desired properties of the intrinsically conductive polymer, for example, flexibility, heat resistance, transparency, cost, ease of processing, and the like. In addition, it is useful for the dopant to have a boiling point of greater than or equal to 120° C., or greater than or equal to 15020 C. to facilitate removal of water during manufacture of the devices. It is also useful for the dopant to be a liquid at doping temperature (e.g., 10 to 50° C., preferably 25° C.) or miscible with a solution of the intrinsically conductive organic polymer and water. For example, the dopant can be ethylene glycol, dimethylsulfoxide (DMSO), dimethylformamide (DMF), 2-butanone, glycerol, sorbitol, hexamethylphosphoramide, and the like, or a combination comprising at least one of the foregoing dopants. Without being bound by theory, it is also believed that in certain embodiments the doping material can function as a plasticizer enabling annealing of the doped electroconductive polymer, thereby increasing the crystalline fraction of the polymer, which can act to modulate the orientation of the crystals to facilitate charge transfer throughout the capacitor device.

The dopant is used in an amount effective to increase the conductivity of the intrinsically conductive organic polymer by at least three orders of magnitude or more, or four orders of magnitude or more, up to five orders of magnitude. For example, the dopant can be present in the doped electroconductive polymer in an amount of 0.1 to 10 wt. %, based on the weight of the intrinsically conductive organic polymer, preferably, 0.5 to 10 wt. %, 1.0 to 10 wt. %, 2.0 wt. % to 9.0 wt. %, 3.0 to 8.0 wt. %, 4.0 wt. % to 7.0 wt. %, or 5.0 to 6.0 wt. %.

The doped electroconductive organic polymer can further comprise various additives known in the art to adjust the properties of the polymers, provided that such additives do not significantly adversely affect the desired properties of the polymers. Examples of such additives include low-molecular weight and oligomeric organic semiconductor materials, thermal curing agents, plasticizers, coupling agents, dyes, flame retardants, wetting agents, dispersants, fillers, viscosity modifiers, and photosensitive monomers, each of which can be present in amounts known in the art, for example 0.01 to 10 wt. %, or 0.01 to 1 wt. %, each based on the total weight of the doped electroconductive organic polymer. In an embodiment the total amount of additive is 0.01 to 10 wt. %, or 0.01 to 1 wt. %, each based on the total weight of the doped electroconductive organic polymer. In another embodiment, no or substantially no additive is present. Examples of low molecular weight and oligomeric organic semiconductor materials include anthracene, tetracene, pentacene, oligothiophene, melocyanine, copper phthalocyanine, perylene, rubrene, coronene, anthradithiophene, and the like.

The doped electroconductive organic polymer can have a conductivity of 900 Siemens/centimeter (S/cm) or greater. For example, the conductivity of the doped electroconductive polymer can be 1000 S/cm or greater, 1200 S/cm or greater, 1300 S/cm or greater, 1400 S/cm or greater, up to 2000 S/cm. The doped electroconductive organic polymer can also have a conductivity of less than 900 Siemens/centimeter (S/cm). In each of the foregoing instances the conductivity is measured on a film having a thickness of 65 nm, a film having a thickness of 40 nm, or a film having a thickness of 10 nm. Thus, it is to be understood that such conductivities can be obtained for films having a thickness of 5 to 200 nm for example, preferably 10 to 150 nm, 20 to 100 nm, 25 to 90 nm, 60 to 80 nm, or 10 to 40 nm. Alternatively, or in addition, the doped electroconductive organic polymer can have a resistivity of $1 \times 10^5$ ohm-cm or less, $1 \times 10^4$ ohm-cm or less, or $1 \times 10^3$ ohm-cm or less. Resistivities as low as 100 ohm-cm can be achieved at the foregoing thicknesses, for example 65 nm, 40 nm, or a film having a thickness of 10 nm.

A wide variety of capacitor devices comprising electrodes and interconnects as described herein can be manufactured, which will now be described in more detail. For example, as shown in FIGS. 1A, 1B, and 1C, a capacitor device 100, e.g., a memory device or a capacitor, comprises a substrate 101, a first electrode 106 disposed on the substrate, a dielectric layer 112 including graphene filler 118 and polymer matrix 120 disposed on and in contact with the first electrode, and a second electrode 116 disposed on and in contact with the dielectric layer 112. Second electrode 116 is optionally patterned. As shown in FIG. 1B, the substrate can be silicon, the first electrode can be a conductive metal such as platinum, and the second electrode can be a conductive metal such as aluminum. Other substrates or conductive metals could be used. As illustrated in FIG. 1C, the dielectric layer is a composite layer comprising a relaxor ferroelectric polymer matrix and hydrazine-reduced graphene.

As used herein, "disposed on" means that an element may or may not be in contact with another element, and that each element may or may not be coextensive. "In contact with" means that an element may be in full or partial contact with another element. Thus, other intervening layers may be disposed between substrate 101 and a first side 102 of electrode 106, and the substrate 101 can be coextensive with the electrode 106 (not shown) or not coextensive, as shown. However, second side 104 of electrode 106 is in full or partial (not shown) contact with a first side 108 of dielectric layer 112; and the second side 110 of dielectric layer 112 is in full or partial contact (not shown) with a first side 114 of second electrode 116.

FIG. 2 shows an all-organic capacitor device including an ULTEM/PET 122 substrate, a PEDOT:PSS 124 first electrode, a PEDOT:PSS second electrode 126 and a doped PEDOT:PSS composite 128.

In a particularly advantageous feature, all-organic devices can be manufactured using the composites described herein. FIG. 3 illustrates a capacitor device fabricated on a flexible substrate having a thin film dielectric between two highly conducting doped PEDOT:PSS electrodes, wherein the thin film dielectric comprises the composite materials of this disclosure, for example HZ-rGO/P(VDF-TrFE-CFE). The flexible substrate can be an organic material such as polyimide, polyetherimide, polycarbonate, polyethylene, polypropylene, polytetrafluoroethylene, or other polymer.

In another embodiment, the doped electroconductive organic polymer can be used as an interconnect in capacitor devices, i.e., an element that electrically connects at least two components of the capacitor device. The interconnect can have a resistivity of $1 \times 10^5$ ohm-cm or less, $1 \times 10^4$ ohm-cm or less, or $1 \times 10^3$ ohm-cm or less. Resistivities as low as 100 ohm-cm can be achieved. The term "interconnect" refers to a conductive element that provides a separate electrical path (or electrical connection) between two electrical components. As used herein "electrical components" includes electrical devices and various components within the same electrical device or between layers of an electrical device. Examples of electrical components include an antenna, a capacitor, a diode, a power source, a resistor, a receiver, a transistor, and the like. At least one of the electrical components is in contact with or contains a dielectric layer. Where the interconnect is between an electrical component such as an antenna, a capacitor, a diode, a power source, a resistor, a receiver, a transistor, and the like, the interconnect is in contact with a conductive element of the device, e.g. a metal contact or pad. Alternatively, as shown in FIG. 3, an interconnect can be in contact with one or both electrode(s) of an electrical device, which in turn is (are) in contact with the dielectric layer in a capacitor.

As shown in FIG. 3, an embodiment of an electrical device 200 comprises a substrate 201 and dielectric layer 212 disposed on the substrate. Electrical components 220, 222 are also disposed on the dielectric layer, and are electrically connected by interconnect 224. Interconnect 224 is an organic interconnect comprising the doped electroconductive organic polymer described herein. Electrical components 220, 222 can be discrete components of electrical device 200, for example an electrode. Interconnect 224 can be connected to electrical components 220, 222 such that it contacts all or a part of electrical components 220, 222. Likewise, interconnect 224 can be of any configuration, for example substantially elongated (e.g., a wire) or a film, or any other suitable configuration.

Thus, a broad variety of interconnects for use in integrated circuits (ICs) can be manufactured, which distribute clock and other signals and provide power/ground to the various ICs. The interconnects can be local (i.e., consisting of very fine lines connecting a functional block, usually spanning only a few gates and occupying only first, and sometimes second conducting layers); intermediate (i.e., wider and taller lines to provide lower resistance and providing clock and signal distribution within a functional block with typical lengths of up to 3 to 4 millimeters); or global (providing clock and signal distribution between functional blocks and delivering power/ground to all functions, occupying the top one or two conductive layers and are typically longer than 4 millimeters; low resistivity global interconnects are important as the bias voltage decreases and the total current consumption of the chip increases).

In a specific embodiment, the capacitor devices are capacitor devices, in particular flexible relaxor ferroelectric thin film devices, where each of the electrodes, interconnects, and the relaxor ferroelectric layers (dielectric layers) has a thickness of 1 to 20,000 nm, 5 to 10,000 nm, where the thickness is the dimension perpendicular to the surfaces of the substrate. As described above, the electrodes and the relaxor ferroelectric layers may be continuous or discontinuous. In the case of discontinuous layer, this means that each portion of the layer is separated from its adjacent portions. In other words, a discontinuous layer is an ensemble of spaced apart, discrete elements. A continuous layer may not necessarily completely cover a surface (it may have openings or vias through the layer). The electrode or interconnect is a doped electroconductive organic polymer, and the electrode or interconnect is disposed on and in contact with at least one surface of the relaxor ferroelectric layer.

For example, the thickness of each layer in a thin film device can be 1 to 20,000 nm, 1 to 10,000 nm, 2 to 5,000 nm, 3 to 1000 nm, 5 to 1000 nm, 5 to 500 nm, 10 to 500 nm, 5 to 200 nm, 10 to 200 nm, 5 to 100 nm, or 10 to 100 nm. While the thickness of each component can vary depending on the application, an organic electrode can have a thickness of 1 or 5 to 150 nm, 10 to 120 nm, 15 to 1000 nm, 20 to 90 nm, or 30 to 80 nm. The dielectric layer can have a thickness of 1 to 20,000 nm, 1 to 10,000 nm, 2 to 5,000 nm, 3 to 1000 nm, 5 to 1000 nm, 5 to 500 nm, 5 to 100 nm, 10 to 90 nm, 15 to 80 nm, 20 to 70 nm, or 30 to 60 nm. A total thickness of the device can be, for example, 2 to 20, 150 nm, 2 to 10,000 nm, 2 to 5,000 nm, 30 to 5000 nm, 30 to 3000 nm, 40 to 2000 nm or 50 to 1000 nm.

A variety of devices can accordingly be manufactured, for example memory devices, non-volatile memory devices, capacitors, transistors, diodes, or electric devices comprising at least one of the foregoing. The capacitor devices described can be positioned in layers of thin films to form larger assemblies, for example integrated circuit boards.

The above-described devices and device components can be manufactured by methods known in the art for capacitor devices and circuit boards and assemblies containing the same. In an embodiment, a method for making a device such as memory device or capacitor comprises depositing a first electrode on surface of a substrate; contacting the first electrode with a dielectric layer film on the side of the electrode opposite the substrate; and contacting the dielectric layer with a second electrode, wherein the first and second electrodes comprise an inorganic material or a doped electroconducting organic polymer, and the dielectric layer comprises the composite material of this disclosure.

Optionally, the substrate can be subjected to various treatments prior to depositing the first electrode, for example, cleaning, a primer treatment, corona treatment, etching treatment, plasma treatment, and the like. For example, the substrate can be cleaned with solvents specific for known contaminants, for example release agents. Exemplary solvents for use with polymer substrates include deionized water, alcohols such as methanol, ethanol, and isopropanol, acetone, ethyl acetate, chlorinated hydrocarbons such as dichloromethane, and the like, or a combination comprising at least one of the foregoing solvents. Washing can also be sequential, for example acetone, followed by isopropanol, followed by water. Substrate cleaning usually takes place prior to device fabrication, but can also be conducted at intermediate stages.

Alternatively, or in addition, the substrates can be corona or plasma treated, for example to render their surface hydrophilic, thus promoting better adhesion with the electrode. Treatment of the surface can be, for example by exposing a surface of the substrate to an oxygen plasma or UV ozone or coating by self-assembled monolayers (SAMs) such as 16-mercaptohexadecanoic acid to render the substrate hydrophilic.

After preparation of the surface of the substrate, and deposition of any intervening layers (e.g., a primer or adhesive), a first electrode is deposited on the substrate, followed by the dielectric layer, followed by the second electrode. The electrodes can be pre-formed and then transferred to the substrate, or formed directly on the preceding layer. Direct formation is generally preferred, particularly in thin film devices. Where the first or second electrode is a known material such as a copper layer, deposition is by methods such as sputtering, ion plating, chemical vapor deposition (CVD), ion beam, and the like.

Deposition of the dielectric layer can further be achieved by means known in the art, for example sputtering, CVD, or deposition of a sol-gel for inorganic materials. Thin films polymer dielectrics can be produced by solution spin coating or dip casting, Langmuir-Blodgett (LB) monolayer growth, vapor deposition polymerization, ink-jet printing, gravure printing, roll-to-roll processing, drop casting, spraying, and the like. These deposition processes can be performed at temperatures below 200° C., which allows their use with organic substrates. For example, in an embodiment, P(VDF-TrFE-CFE)/HZ-rGO composite materials is dispersed/dissolved in dimethylformamide (DMF) or 2-butanone, with a resulting concentration typically ranging from 0.5 wt. % to 10 wt. %. Then the dispersion/solution is spun coat to provide a layer. Films with various thicknesses can be obtained by controlling the spin conditions, solution concentration, and/or using a multiple coating process. For example, spin-coating can be at 100 to 6000 rpm, 500 to 5000 rpm, 1000 to 4000 rpm, 1500 to 3000 rpm, or 2000 to 2500 rpm for a period of, for example 5 to 120 seconds, preferably, 15 to 90 seconds, more preferably, 20 to 70 second, forming the dielectric layer.

Similarly, deposition of the doped electroconductive organic polymer can be accomplished by coating methods such as solution spin coating, solution casting, ink-jet printing, drop casting, gravure printing, roll-to-roll processing, and the like. In an embodiment, deposition is by spin-casting a solution of the intrinsically conductive organic polymer, dopant, and a solvent at, for example 100 to 6000 rpm, 500 to 5000 rpm, 1000 to 4000 rpm, 1500 to 3000 rpm, or 2000 to 2500 rpm for a period of, for example 5 to 60 seconds, 15 to 45 seconds, or 20 to 40 seconds to form a layer of the doped electroconductive organic polymer. Alternatively, the doped electroconductive organic polymer can be deposited in a pattern, for example by lithography, ink-jet printing such as drop-on-demand piezoelectric ink-jet printing technique, or drop casting, to form a patterned layer of the doped electroconductive organic polymer.

Forming the layer is followed by annealing the layer for a time and at a temperature effective to remove residual solvent in which the doped electroconductive organic polymer is dissolved, typically water or a combination of water and another solvent. The temperature used for annealing may be constant or may increase throughout the annealing process, for example may be maintained at a fixed temperature above the glass transition temperature (T-Tg).

The electrode can be further patterned before or after heat annealing, for example by reactive ion etch (RIE). For example, in reactive ion etching a mask containing the desired electrode pattern is placed on top of the electrode film and a highly directional flux of energetic, reactive ions is delivered to the material surface. In doing so, a precisely controlled patterning of the electrode film layer occurs as un-masked sample is etched away by the reactive ions.

A method for the manufacture of an interconnect comprises contacting a first electrical component and a second electrical component of an electrical device with a doped electroconducting organic polymer to form an electrical connection between the devices, wherein one or both of the components contacts or comprises a dielectric layer, which contains a composite material of this disclosure. The interconnect can be formed by lithography, ink-jet printing, or drop casting to provide a pattern, or a film can be deposited, and a shape or pattern formed from the film, for example by REI.

Hydrazine-reduced graphene oxide greatly improves the dielectric permittivity of ferroelectric materials in low loadings without any significant dielectric losses. The HZ-rGO/ relaxor ferroelectric composite materials of the disclosure can advantageously be used with organic electrodes to manufacture various capacitor devices on flexible substrates. A wide variety of flexible substrates can be used, including synthetic polymers, paper, cloth, or other natural substances, which allows manufacture of a correspondingly wide variety of articles comprising the capacitor devices. Thus, articles as diverse as banknotes, clothing, credit cards, debit cards, security devices, or foodstuffs can now be provided with electrical devices such as memory devices, capacitors, sensors and the like.

The following examples are merely illustrative of the devices and methods disclosed herein and are not intended to limit the scope hereof.

EXAMPLES

Example 1

A hydrazine monohydrate reduced graphene oxide/P(VDF-TrFE-CFE) composite material was prepared as follows.

Graphene oxide was prepared from natural graphite according to a modified Hummer's method as described by Park. S. et al. in Chemical Materials, volume 20, pp. 6592-4 (2008). For example, 75 ml of concentrated sulfuric acid was added to 1.5 g of graphite powder and 1.5 g of sodium nitrate in the beaker and stirred for 15 min at room temperature before the beaker was kept in an ice bath. Then 9 g of potassium permanganate was added slowly into the mixture and kept in the ice bath for 30 min. After the ice bath was removed, the reaction was continued for 48 hours under stirring at room temperature. The brown slurry or thick paste was then added into 138 ml of deionized (DI) water and the brown suspension was stirred for 10 min Next, 420 ml of warm water was added followed by a slow addition of 30 ml of hydrogen peroxide to provide a yellow suspension. The suspension was centrifuged and washed by a mixed aqueous solution of 6 wt % $H_2SO_4$/1 wt % $H_2O_2$, and then by water and dried in vacuum at 60° C. for 36 hours to obtain the graphite oxide powder.

Individual graphite oxide platelets were added to water, then ultrasonicated to provide a suspension of exfoliated graphene oxide. Hydrazine monohydrate was subsequently added to the suspension. The mixture stirred at 80° C. for 12 hours yielded a hydrazine-reduced graphene oxide powder. The powder was filtered and dried. The experiment procedure for hydrazine reduction was described by Park S et al. at Carbon 49 (2011) 3019-3023.

The HZ-rGO powder was weighted according to the desired loading. Then the powder was suspended in dimethylformamide (DMF) and ultrasonicated for 1 hour. The P(VDF-TrFE-CFE) was added to the DMF suspension, and the mixture was stirred at 80° C. for 30 minutes, followed by ultrasonication for 2 hours. The resulting HZ-rGO/P(VDF-TrFE-CFE) composite material was ready for casting.

To obtain HT-rGO, an aqueous solution of graphene oxide prepared by ultrasonication is sealed in a Teflon-lined autoclave and maintained at an elevated temperature for a period of time, for example at 180° C. for 6 hours. After cooling to room temperature, the resultant black product may be filtered and washed by de-ionized water until a pH value of about 7 is obtained. A composite containing the HT-rGO is obtained as described above.

Example 2

With reference to FIGS. 1A, 1B, and 1C, a capacitor device 100 was fabricated on a platinum coated silicon substrate 101 having a dielectric thin film 112 between the platinum 106 and aluminum electrode 116.

Platinum coated silicon substrates were cleaned with acetone, isopropanol and deionized water. HZ-rGO/P(VDF-TrFE-CFE) composite material in DMF was drop-cast directly onto platinum. The cast film was left to dry overnight in air. Air-dried films were transferred into a vacuum oven and dried at 70° C. for 48 h. Top aluminum electrodes were thermally evaporated and patterned on the top surface of the films using a shadow-mask

Example 3

Capacitors can be fabricated using different substrates and/or electrodes. All-organic capacitor devices can be fabricated on high performance polyetherimide substrates such as SABIC ULTEM® 1000B. Given the low temperature processing of the composite materials of this disclosure, fabrication can also be extended to other substrates such as PET and LEXAN®. These flexible substrates are coated with a thin layer of highly conducting polymer(poly(3,4-ethylene-dioxythiophene):poly(styrene sulfonic acid), PEDOT:PSS Clevios PH-1000 (Heraeus) doped with ~4% Dimethylsulfoxide (DMSO)), serving as a bottom electrode. Top electrodes are patterned via inkjet printing of doped PH1000. FIG. 3 illustrates a capacitor device fabricated on a flexible substrate having a thin film dielectric between two highly conducting doped PEDOT:PSS electrodes, wherein the dielectric thin film comprises the composite materials of this disclosure, for example HZ-rGO/P(VDF-TrFE-CFE).

Example 4

Figure 4A:
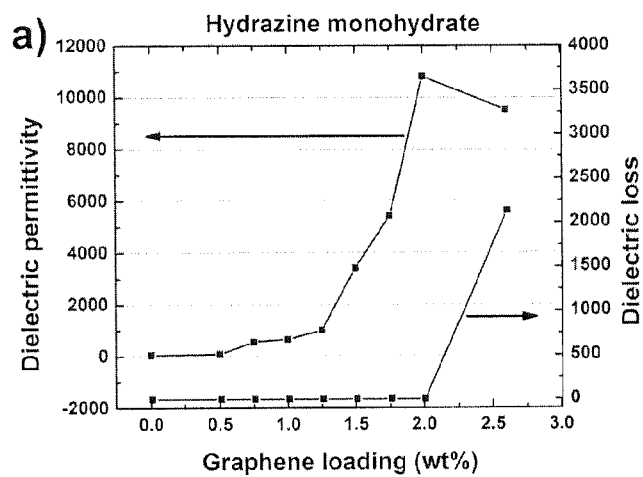
FIG. 4A illustrates dielectric permittivity (left axis) and dielectric loss (right axis) of a P(VDF-TrFE-CFE)/hydrazine-reduced graphene oxide (HZ-rGO) composite as a function of graphene loading (wt. %), measured at 1 kHz and room temperature.

Composite samples with different HZ-rGO loadings (in wt. %) were prepared to identify the percolation threshold. Dielectric spectroscopy was used for dielectric permittivity and dielectric loss measurements. As seen from FIG. 4A, a sharp increase in dielectric permittivity is observed by adding only small increments of HZ-rGO. The dielectric permittivity continues to increase sharply, reaching a permittivity of about 11,000 at only 2 wt. % HZ-rGO loading.

Figure 4B:
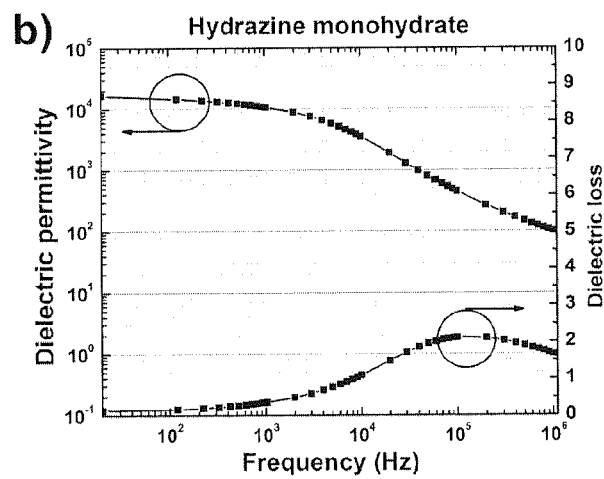
FIG. 4B illustrates the dependence of dielectric permittivity on the frequency for P(VDF-TrFE-CFE)/HZ-rGO with 2 wt. % HZ-rGO loading at room temperature.

Surprisingly, the dielectric loss of the composite materials of this disclosure, even at 2 wt. % HZ-rGO loading, was maintained below 2. The low losses are evident as shown from the frequency sweeps from 20 Hz to 1 MHz (see FIG. 4B). These results were verified by repeating device fabrication twice using different batches of identically reduced graphene oxide. In contrast, composites based on exfoliated graphite nanoplates and poly(vinylidene fluoride), although had improved dielectric permittivity, displayed an early sharp rise in the dielectric loss. See He et al., Adv. Mater., volume 21, pp. 710-715 (2009).

Comparative Example 5

Additional data was obtained using two different types of graphene: hydrothermally reduced graphite oxide (HT-rGO) and commercially available graphene nanoplatelets.

Hydrothermally reduced graphite oxide (HT-rGO) can be prepared as follows. First, graphite was oxidized as described by the Hummers method as above. Thereafter, 37.5 ml of 0.5 mg/ml graphene oxide (GO) aqueous solution prepared by probe Ultrasonication (160 W) for 1 h was sealed in a 50 ml Teflon-lined autoclave and maintained at 180° C. for 6 h. It was then cooled to room temperature; the resultant black product was filtered and washed by DI water. Zhou et al., Chem. Mater., volume 21, number 13, pp. 2950-2956 (2009).

The commercially available graphene nanoplatelets (Grade 3) were purchased from www.cheaptubes.com, and it has the following characteristics: surface areas 600-750 m²/g, 4-5 layers, an average thickness of 8 nm, and typical particle diameters of less than 2 microns.

Figure 5A:
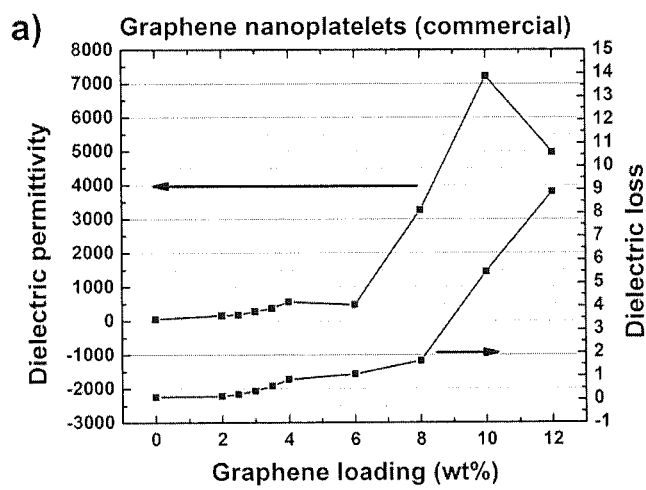
FIGS. 5A and 5B illustrate dielectric permittivity (left axis) and dielectric loss (right axis) of a P(VDF-TrFE-CFE)/HZ-rGO composite as a function of HZ-rGO loading (wt. %), measured at 1 kHz and room temperature using commercial graphene nanoplatelets (FIG. 5A) and HT-rGO (FIG. 5B)
Figure 5B:
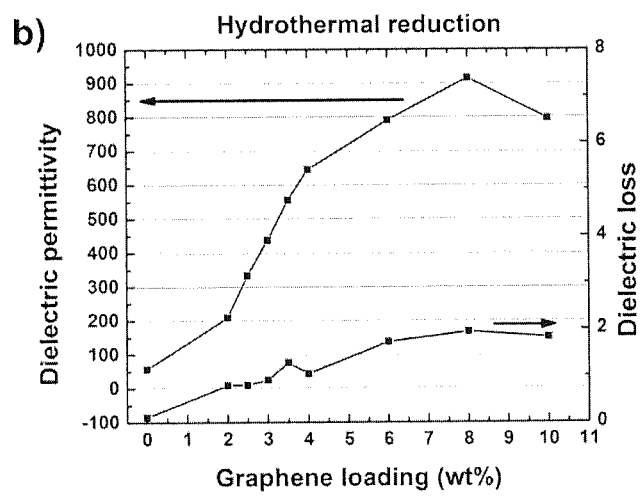

For consistency, fabrication procedures were kept constant and a complete set of loadings were studied until reaching percolation. Similar to what was reported in the literature, commercial graphene nanoplatelets displayed dielectric enhancements, but with a significant rise in the dielectric loss. Additionally, high loadings up to 10 wt. % were required to reach maximum dielectric enhancement (see FIG. 5A). For the hydrothermally reduced graphite oxide, dielectric enhancements were very limited with a dielectric permittivity not exceeding 1000 (see FIG. 5B), which is significantly below the dielectric permittivity of about 11,000 at only 2 wt. % HZ-rGO loading as shown in Example 4 for some embodiments of the composite materials of this disclosure.

This comparative study demonstrates that the HZ-rGO/P (VDF-TrFE-CFE) composite material has superior performance in having a combination of high dielectric permittivity and low dielectric losses as compared to (HT-rGO)/P(VDF-TrFE-CFE) and (graphene nanoplatelets)/P(VDF-TrFE-CFE) composite materials.

Example 6

A more detailed comparative study of GO, HZ-rGO, and HT-rGO was made. Each was prepared as described above. The structure and properties of graphene were studied using Fourier transform infrared spectroscopy (FT-IR) in transmission mode (Nicolet iS10—Thermo Scientific). A 13 mm KBr pellet was prepared using a manual press (CrushIR, Pike Technologies Inc.) for the background spectrum. 1 wt. % graphene (modified and unmodified) were homogenously mixed with KBr for spectroscopic measurement. The cross-section of the composite films was investigated by Scanning Electron Microscopy (FEI—Nova NanoSEM 630). Frequency-dependent capacitance was measured with an Agilent LCR meter (4980A) in the frequency range from 20 Hz to 1 MHz and an oscillation signal about 50 mVrms with a parallel equivalent circuit.

Figure 6A:
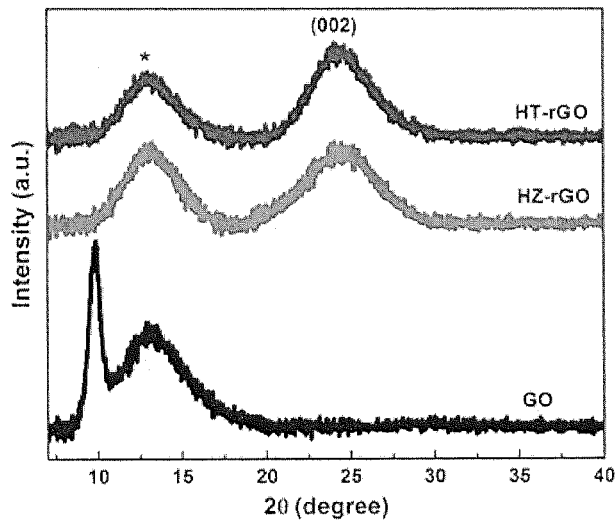
FIG. 6A is a graph of intensity (arbitrary unit, a. u.) versus $2\theta$ (degrees) illustrating XRD pattern for graphite oxide (GO), hydrothermally-reduced graphene oxide (HT-rGO), and HZ-rGO.

FIG. 6A shows powder X-ray diffraction (XRD) patterns of the GO, HZ-rGO, and HT-rGO. The sharp peak of GO at about 9.9° corresponding to the (002) peak clearly indicates an interlayer expansion of about 8.9 Å by intercalation of oxygen species. Following the reduction process, the (002) peak shifts back to 24.5° with an interlayer spacing of 3.6 Å for both HZ-rGO and HT-rGO, due to restacking of graphene sheets upon removal of oxygen groups.

Figure 6B:
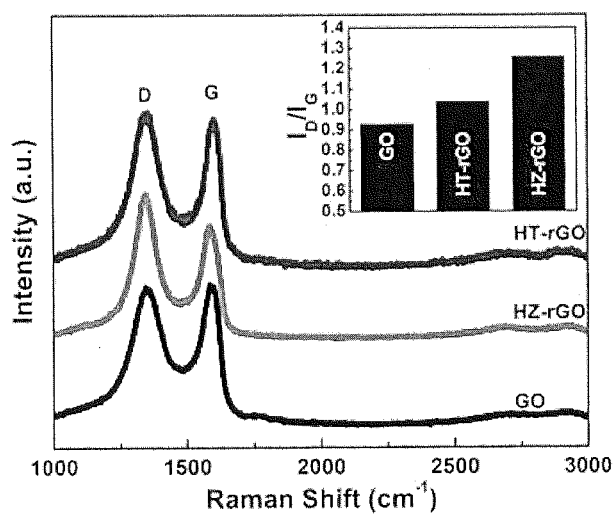
FIG. 6B shows a graph of intensity (arbitrary unit, a. u.) versus Raman shift (reverse centimeters, $cm^{-1}$) illustrating RAMAN spectra of GO, HT-rGO, and HZ-rGO, wherein inset is the $I_D/I_G$ intensity ratio for qualitative comparison on defect density.
Figure 6C:
FIGS. 6C, 6D, and 6E illustrate SEM images of GO, HZ-rGO, and HT-rGO, respectively.
Figure 6D:
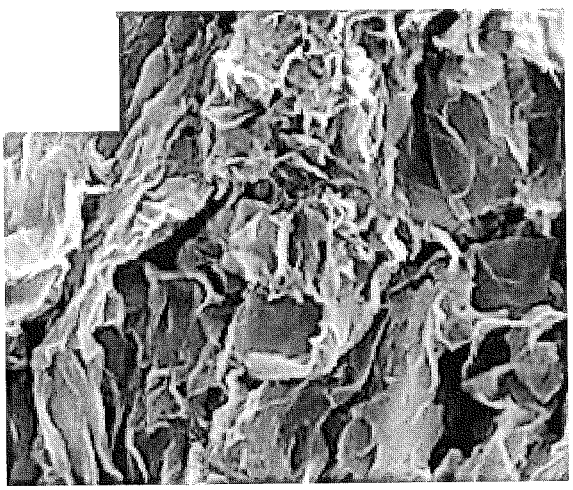
Figure 6E:
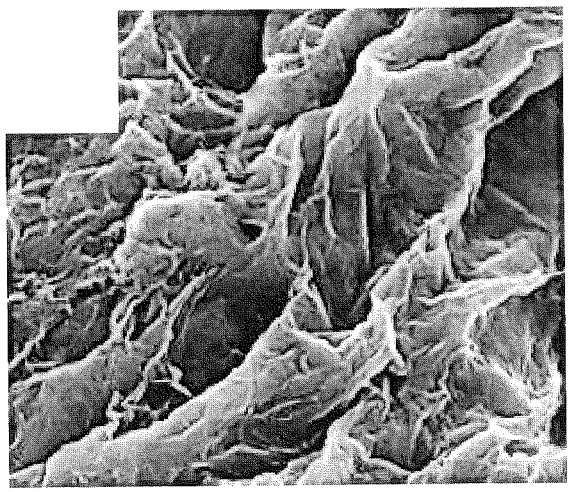

FIG. 6B shows the Raman spectrum of GO, HZ-rGO, and HT-rGO. The intensity ratios ($I_D/I_G$) of the D band at 1351 cm$^{-1}$ and G band at 1575 cm$^{-1}$ were used to qualitatively characterize the defect density of rGO before/after reduction, as shown in the inset of FIG. 6B. Oxidation of graphite following strong acid treatment clearly creates defective GO with an $I_D/I_G$ of about 0.93. Further increase in defect density was observed following both reductions, with HZ-rGO showing more pronounced defect formation giving an $I_D/I_G$ of about 1.26. This is attributed to fewer in-plane sp² domains upon the incorporation of nitrogen atoms following the hydrazine reduction process. FIGS. 6C to 6E show powder SEM images of GO, HZ-rGO, and HT-rGO, respectively. Graphite oxide nanosheets form wrinkled morphology after both reduction processes.

Figures 7A, 7B, 7C:
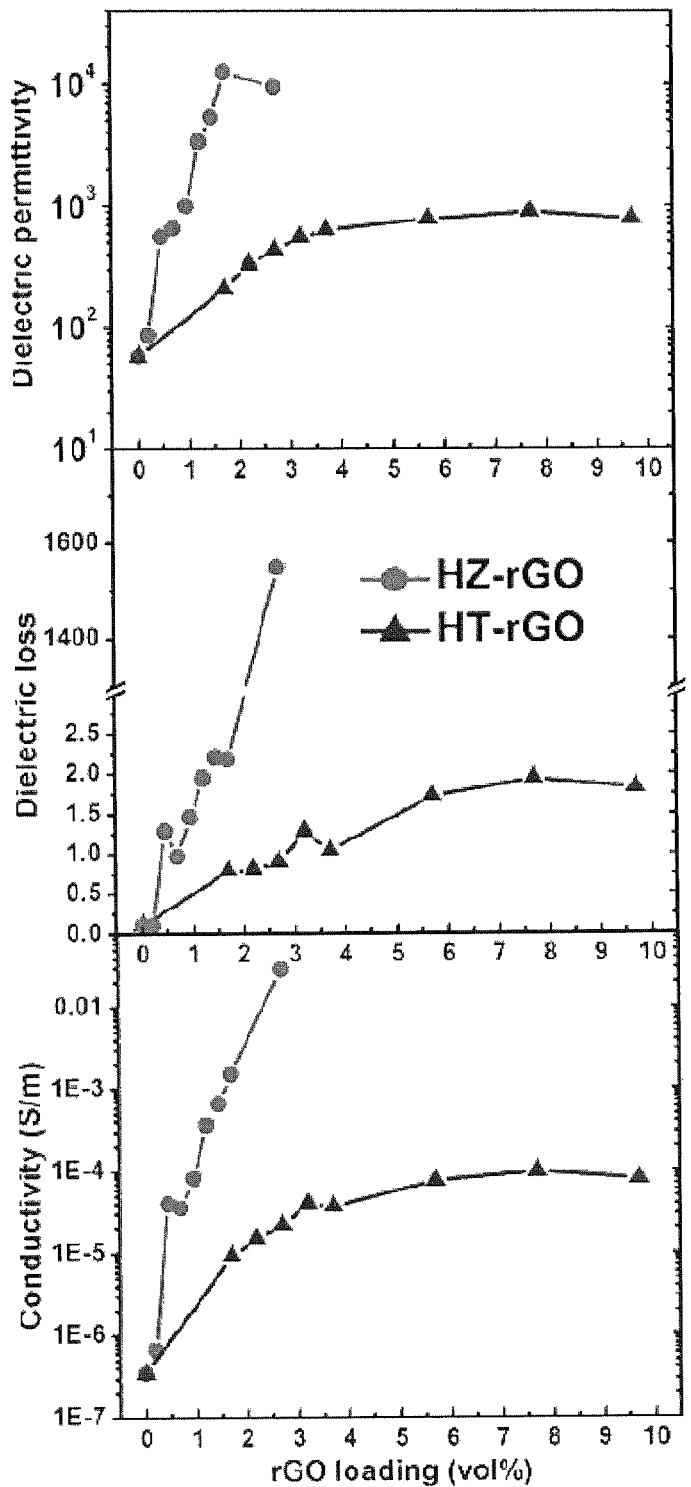
FIGS. 7A, 7B, and 7C are, respectively, graphs of dielectric permittivity, dielectric loss, and conductivity (Siemens per meter) versus loading of reduced graphene oxide (GO) (percent by volume, vol %) of a P(VDF-TrFE-CFE)/HZ-rGO nanocomposite and a P(VDF-TrFE-CFE)/HT-rGO composite, measured at room temperature and 1 kHz.

The influence of reduction route on the dielectric permittivity, loss tangent, and ac conductivity at 1 kHz and room temperature was evaluated as a function of filler loading, as shown in FIGS. 7A to 7C. As shown in FIG. 7A, a higher dielectric permittivity is achieved by increasing the graphene filler loading, it is believed mainly due to an increase in microcapacitor formation combined with the Maxwell-Wagner-Sillars (MWS) interfacial polarization. A dielectric of greater than 10,000 was achieved using 1.7 vol % HZ-rGO, while a dielectric of only about 900 was reached using a HT-rGO loading up to about 7.7 vol %. Further increase in filler loading in either case leads to a drop in the dielectric permittivity due to increasing leakage currents. Similarly in FIG. 7B, the dielectric loss increases with loading, also due to the formation of conductive paths within the composites. With the exception of an abrupt increase in loss at 2.7 vol % HZ-rGO, both systems displayed losses ranging between 0.8 and 2.

Figure 8:
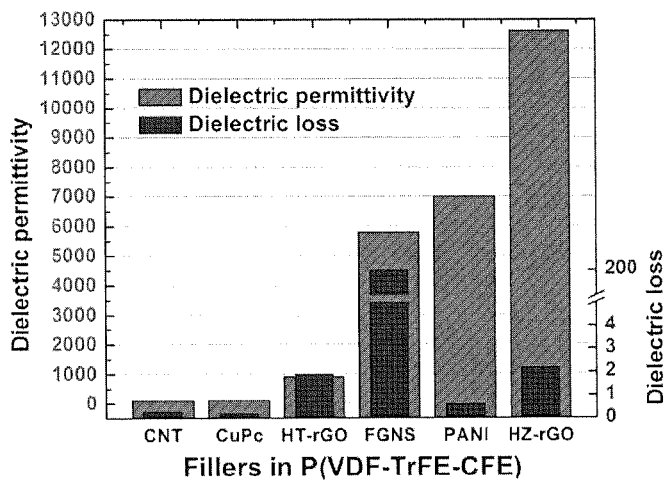
FIG. 8 is a bar chart comparing the maximum dielectric permittivity and corresponding dielectric loss reported in the literature using P(VDF-TrFE-CFE) polymer as a matrix in percolative composites.

It is further believed that the HZ-rGO system displays the highest dielectric permittivity value reported for percolative composites using P(VDF-TrFE-CFE) as the polymer matrix, as summarized in the chart in FIG. 8. Although a dielectric permittivity above 10,000 was reached, the dielectric loss for HZ-rGO remained relatively low.

The effective a.c. conductivity as a function of rGO loading is shown in FIG. 7C. A steep insulator-to-conductor transition at very low filler loadings is clearly observed in the HZ-rGO system reaching a maximum conductivity of about 0.03 Sm$^{-1}$. Without being bound by theory, the increase in a.c. conductivity with filler loading can be attributed to the gradual formation of an interconnecting graphene nanosheet network. This reflects better restoration of sp² carbon by hydrazine monohydrate in HZ-rGO.

Figure 9A:
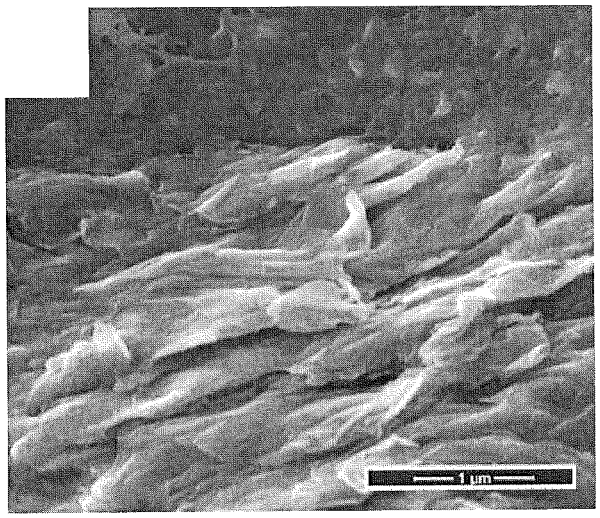
FIG. 9A is a cross-section SEM of P(VDF-TrFE-CFE)/HT-rGO nanocomposite.
Figure 9B:
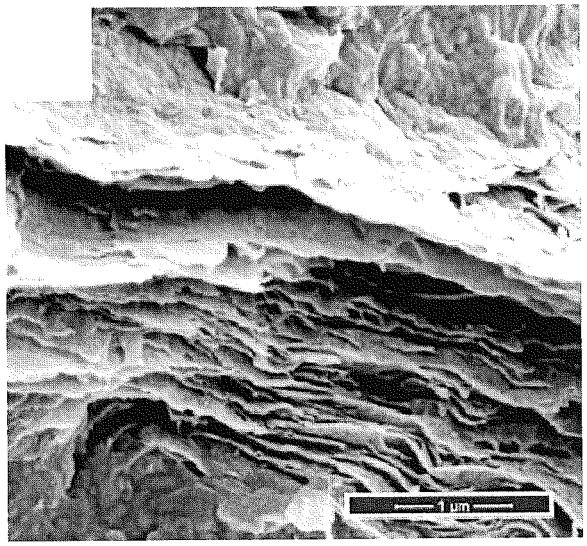
FIG. 9B is a cross-section SEM of P(VDF-TrFE-CFE)/HZ-rGO nanocomposite.

It is known that achieving homogenously dispersed fillers in a polymer matrix is critical to the performance of composites, and the stability of rGO in solvents has been shown to contribute towards higher performance composites. In this study, very stable graphene colloids over long periods were achieved following 1 hour sonication of both HT-rGO and HZ-rGO in DMF. However, HZ-rGO exhibited significantly larger dielectric enhancements at a much lower percolation threshold. This may be explained by the reduction method having an influence on the resulting morphology of rGO in the polymer. Cross-sectional SEMs of 2 wt % HT-rGO and HZ-rGO in the polymer are shown in FIGS. 9A and 9B, respectively. In FIG. 9A, wrinkled HT-rGO sheets are randomly oriented in the polymer medium as opposed to the flat and layered HZ-rGO nanosheets seen in FIG. 9B. Such lamellar morphologies are common to graphene-based percolative composites, typically described as microcapacitors. Thus, it is believed that the dielectric permittivity and percolation threshold values are also strongly dependent on polymer/filler interfacial interactions.

Figure 10A:
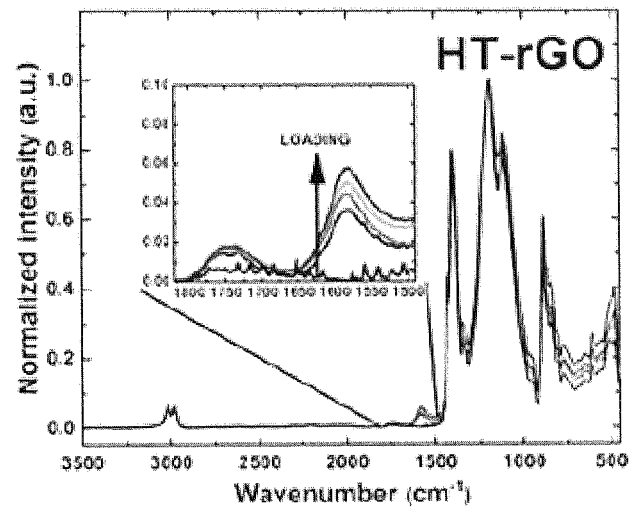
FIGS. 10A and 10B are graphs of normalized intensity (arbitrary unit, a. u.) versus wavenumber (reverse centimeters, $cm^{-1}$) showing, respectively, FTIR spectra of P(VDF-TrFE-CFE)/HT-rGO, and P(VDF-TrFE-CFE)/HZ-rGO under different rGO loadings.
Figure 10B:
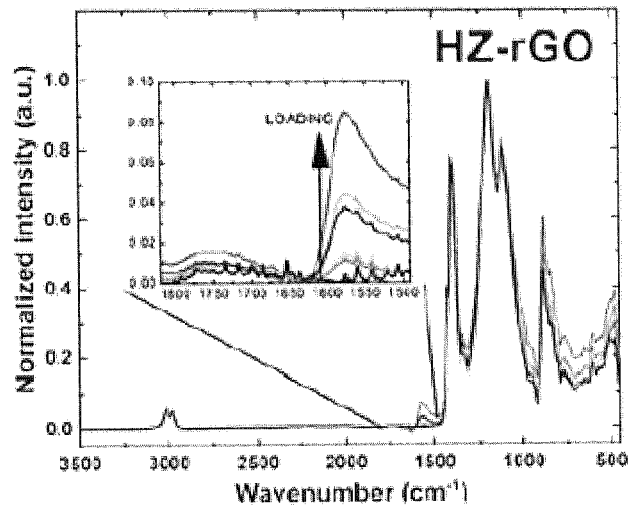
Figure 10C:
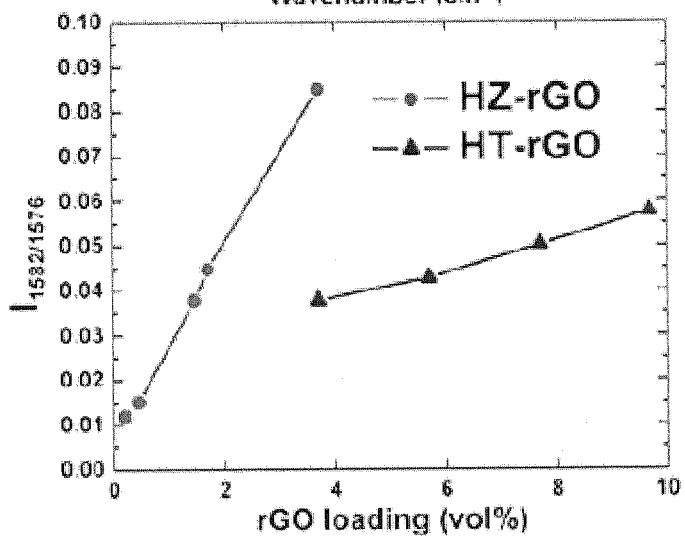
FIG. 10C is a graph comparing rGO peak intensities as a function of loading for both composite systems.

FIGS. 10A to 10C show FTIR characterization of the polymer composites at different loadings of rGO. All bands between 400-1500 cm$^{-1}$ are characteristic of P(VDF-TrFE-CFE). In FIG. 10A, upon the addition of HT-rGO to the polymer, two additional bands at 1582 cm$^{-1}$ and 1745 cm$^{-1}$ appear, corresponding to the stretching vibrations of aromatic C=C and carboxyl C=O, respectively. The presence of the carboxyl peak reflects partial restoration of the sp² carbon network following hydrothermal reduction, which directly affects the overall conductivity of HT-rGO. Similarly, in FIG. 10B, bands at 1576 cm$^{-1}$ and 1745 cm$^{-1}$ appear for the composite containing HZ-rGO. These vibrations clearly originate from the rGO sheets present in the polymer composite. After normalizing all spectra relative to the polymer CF$_2$ stretching vibration at 1194 cm$^{-1}$, the C=C band intensities increase linearly with rGO loading as shown in FIG. 10C. Notably, the band at 1576 cm$^{-1}$ from HZ-rGO, relative to the 1582 cm$^{-1}$ from HT-rGO, increases more rapidly with rGO loading. It is believed that this is due to a combination of aromatic C=C skeletal and C=N stretching vibrations found in HZ-rGO. From the FTIR spectra, it can be confirmed that the HZ-rGO composite contains more aromatic $sp^2$ carbon leading to the higher conductivity depicted in the dielectric characterization.

Figure 11:
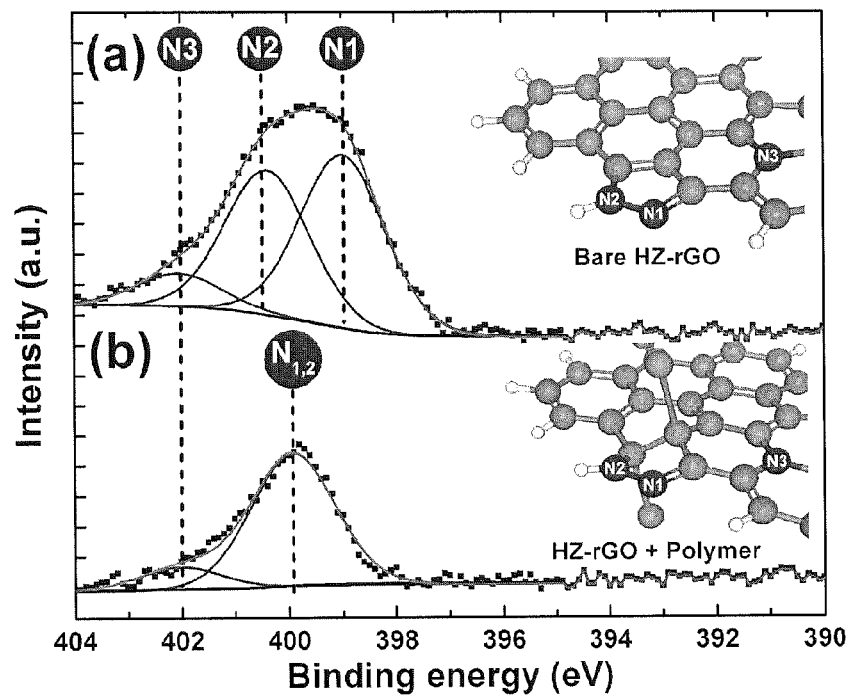
FIG. 11 is an XPS spectra showing HZ-rGO at (a) before addition to P(VDF-TrFE-CFE), and after addition to P(VDF-TrFE-CFE) at (b), wherein the insets are the corresponding structure of the 5-membered ring on the edge of HZ-rGO sheets.

It is further known that the presence of some remaining oxygen groups in both rGOs contributes to dispersion stability in solvents, but it does not explain the distinct high dispersion efficiency unique to the HZ-rGO composite after annealing. Recent work describing the reaction mechanism of hydrazine-treated rGO shows the formation N—N moieties (pyrazole/pyrazoline) at the graphene edges, better described as a reduction/substitution reaction (Park, S., et al., *Chemical structures of hydrazine-treated graphene oxide and generation of aromatic nitrogen doping*. Nature Communications, (2012), vol. 3, p. 638). Thus, these moieties along the HZ-rGO edges may play an important role in rGO/polymer interactions and the resultant dielectric performance High-resolution XPS spectra of HZ-rGO before/after dispersion in polymer were investigated. In FIG. 11 at (a), the XPS spectrum shows pyrazole-like graphene edges reflect the two well-resolved nitrogen peaks at BE=399.0 eV for 2-fold coordinated $N_1$ with a lone pair of electrons and BE=400.4 eV for 3-fold coordinated $N_2$ with a hydrogen atom attached along the $sp^2$ plane. The peak at 402.0 eV is attributed to graphitic/quaternary. Upon dispersion of HZ-rGO in the polymer, only one symmetrical peak around 400.0 eV is observed, as shown in FIG. 11 at (b). Previous XPS studies on similar aromatic systems have shown that the removal of the C=C double bond in the pyrazole ring confines the electron lone-pair in the adjacent $N_2$ atom, shifting it core-level energy to nearly coincide with that of the $N_1$ atom which leads to the unresolved peak separation. This signifies the formation of pyrazoline-like structure at the edges of graphene (FIG. 11(b) inset) after mixing with the polymer. The $N_1$ and $N_2$ atoms in the pyrazoline-like structure have 2 relatively free electron lone-pairs permitting possible electrostatic interplay with the polymer.

Figure 12:
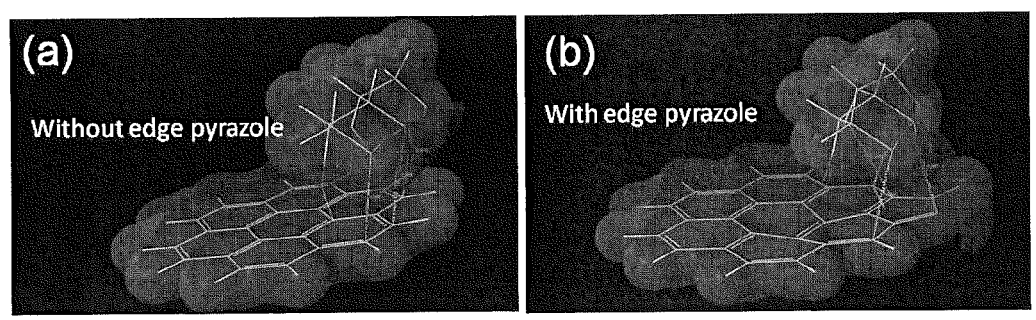
FIG. 12 shows the electrostatic potential distribution using density functional theory to describe the influence of interfacial charge distribution a) without, and b) with pyrazole group on the edges of graphene.

Electrostatic potential (EP) distribution using Density Functional Theory (DFT) was used to visualize how the presence of pyrazole along the graphene edges may influence interfacial charge distribution upon interacting with the polymer. As a conceptual model, it is assumed that one monolayer graphene with 7 aromatic rings in close proximity with the fluorine atoms in the polymer. The EP distribution of graphene without edge pyrazole groups (FIG. 12(a)), showed uniform EP distribution on the surface of graphene with more negative charges confined to the fluorine atoms along the polymer chain. Polymer/graphene interactions, primarily with the π-electric field in the plane of pristine graphene, yield strong H-bonding. However, the EP distribution changes upon the addition of a pyrazole ring to graphene (FIG. 12(b)). The pyridinic-like $sp^2$ nitrogen ($N_2$) shifts electron charges at the graphene/polymer interface, leading to more enhanced electrostatic interactions, particularly near the N—N moieties. The formation of electron-rich regions in graphene via aromatic N—N doping would enhance entrapment of free charges that induce interfacial polarization.

In sum, in this example, dielectric performance of two polymer/graphene composite systems, fabricated under constant conditions, was compared as a function the reduction method. The reduction routes resulted in significant variation in the quality of dispersion, magnitude of dielectric enhancement, and the percolation threshold. Dispersing hydrazine-reduced graphene in the polymer provided a superior performance. Nitrogen-doping by hydrazine displayed a peak dielectric of about 10,000 while simultaneously maintaining a dielectric loss below 2.

In various specific embodiments, a composite material comprises a polymeric material, preferably an organic relaxor ferroelectric material comprising a fluorinated polymer, a fluorinated copolymer, or a combination comprising at least one of the foregoing, and more preferably polyvinylidene fluoride, poly(vinylidene fluoride-co-trifluoroethylene), poly (vinylidenefluoride-co-trifluoroethylene-co-chlorofluoroethylene), or a combination comprising at least one of the foregoing; and a hydrazine-reduced graphene oxide, preferably wherein the weight ratio of the relaxor ferroelectric material to the hydrazine-reduced graphene oxide is 9:1 to 200:1.

A method of making a composite material comprises contacting a hydrazine-reduced graphene oxide with a relaxor ferroelectric material, preferably an organic relaxor ferroelectric material comprising a fluorinated polymer, a fluorinated copolymer, or a combination comprising at least one of the foregoing, and more preferably a polyvinylidene fluoride, poly(vinylidene fluoride-co-trifluoroethylene), poly(vinylidenefluoride-co-trifluoroethylene-co-chlorofluoroethylene), or a combination comprising at least one of the foregoing, in the presence of a solvent, or contacting graphene oxide with the polymeric material in the presence of a solvent; and reducing graphene oxide with hydrazine.

A capacitor device comprises a substrate, preferably a flexible organic substrate; a first electrode disposed on the substrate; a dielectric layer disposed on and in contact with the first electrode; and a second electrode disposed on and in contact with the dielectric layer, preferably wherein the first electrode, the second electrode, or both are organic electrode; wherein the dielectric layer comprises a composite material comprises a polymeric material, preferably an organic relaxor ferroelectric material comprising a fluorinated polymer, a fluorinated copolymer, or a combination comprising at least one of the foregoing, and more preferably polyvinylidene fluoride, poly(vinylidene fluoride-co-trifluoroethylene), poly (vinylidenefluoride-co-trifluoroethylene-co-chlorofluoroethylene), or a combination comprising at least one of the foregoing; and a hydrazine-reduced graphene oxide, preferably wherein the weight ratio of the relaxor ferroelectric material to the hydrazine-reduced graphene oxide is 9:1 to 200:1. When the first, second, or both electrodes are organic, preferably the organic electrode comprises an intrinsically conductive organic polymer, preferably poly(phenylene), poly(naphthalene), poly(azulene), poly(fluorene), poly (pyrene) poly(pyrrole), poly(carbazole), poly(indole), poly (azepine), poly(aniline) poly(thiophene), poly(3,4-ethylenedioxythiophene), poly(p-phenylene-sulfide), poly (acetylene), poly(p-phenylene vinylene), copolymers of the foregoing polymers, or a combination comprising at least one of the foregoing polymers or copolymers; and a dopant, preferably ethylene glycol, 2-butanone, dimethylsulfoxide, dimethylformamide, glycerol, sorbitol, hexamethylphosphoramide, or a combination comprising at least one of the foregoing dopants; and the dopant is present in an amount in an amount effective to increase the electroconductivity of the intrinsically conductive organic polymer, preferably from 2.0 to 10.0 wt. % based on the weight of the intrinsically conductive organic polymer. Most preferably, one or all of the electrodes comprise poly(3,4-ethylenedioxythiophene)-poly(styrenesulfonate) doped with dimethylsulfoxide. The first and second electrodes and the dielectric layer have a thickness of 1 nm to 20 µm. The capacitor device can be a memory device, a capacitor, a transistor, or a diode.

A method of making a capacitor device includes disposing a first electrode on a substrate; disposing a dielectric layer on the first electrode; and disposing a second electrode on the dielectric layer, wherein the dielectric layer comprises a polymeric material, preferably an organic relaxor ferroelectric material comprising a fluorinated polymer, a fluorinated copolymer, or a combination comprising at least one of the foregoing, and more preferably polyvinylidene fluoride, poly (vinylidene fluoride-co-trifluoroethylene), poly(vinylidene-fluoride-co-trifluoroethylene-co-chlorofluoroethylene), or a combination comprising at least one of the foregoing; and a hydrazine-reduced graphene oxide, preferably wherein the weight ratio of the relaxor ferroelectric material to the hydrazine-reduced graphene oxide is 9:1 to 200:1, preferably wherein the first, second, or both electrodes are organic, more preferably wherein the organic electrode comprises an intrinsically conductive organic polymer, preferably poly(phenylene), poly(naphthalene), poly(azulene), poly(fluorene), poly(pyrene) poly(pyrrole), poly(carbazole), poly(indole), poly(azepine), poly(aniline) poly(thiophene), poly(3,4-ethylenedioxythiophene), poly(p-phenylene-sulfide), poly (acetylene), poly(p-phenylene vinylene), copolymers of the foregoing polymers, or a combination comprising at least one of the foregoing polymers or copolymers; and a dopant, preferably ethylene glycol, 2-butanone, dimethylsulfoxide, dimethylformamide, glycerol, sorbitol, hexamethylphosphoramide, or a combination comprising at least one of the foregoing dopants; and the dopant is present in an amount in an amount effective to increase the electroconductivity of the intrinsically conductive organic polymer, preferably from 2.0 to 10.0 wt. % based on the weight of the intrinsically conductive organic polymer. Most preferably, one or all of the electrodes comprise poly(3,4-ethylenedioxythiophene)-poly(styrenesulfonate) doped with dimethylsulfoxide. The first and second electrodes and the dielectric layer have a thickness of 1 nm to 20 μm. The method can further comprise patterning the second electrode, for example by ink-jet printing.

In still another embodiment, an electric component comprises an interconnect that electrically connects at least two elements of the electrical device, wherein the elements of the electrical device comprises or in contact with a dielectric layer comprises a composite material comprises a polymeric material, preferably an organic relaxor ferroelectric material comprising a fluorinated polymer, a fluorinated copolymer, or a combination comprising at least one of the foregoing, and more preferably polyvinylidene fluoride, poly(vinylidene fluoride-co-trifluoroethylene), poly(vinylidenefluoride-co-trifluoroethylene-co-chlorofluoroethylene), or a combination comprising at least one of the foregoing; and a hydrazine-reduced graphene oxide, preferably wherein the weight ratio of the relaxor ferroelectric material to the hydrazine-reduced graphene oxide is 9:1 to 200:1. One or both of the elements of the electric device can be organic, preferably comprising an intrinsically conductive organic polymer, preferably poly (phenylene), poly(naphthalene), poly(azulene), poly(fluorene), poly(pyrene) poly(pyrrole), poly(carbazole), poly(indole), poly(azepine), poly(aniline) poly(thiophene), poly(3,4-ethylenedioxythiophene), poly(p-phenylene-sulfide), poly (acetylene), poly(p-phenylene vinylene), copolymers of the foregoing polymers, or a combination comprising at least one of the foregoing polymers or copolymers; and a dopant, preferably ethylene glycol, 2-butanone, dimethylsulfoxide, dimethylformamide, glycerol, sorbitol, hexamethylphosphoramide, or a combination comprising at least one of the foregoing dopants; and the dopant is present in an amount in an amount effective to increase the electroconductivity of the intrinsically conductive organic polymer, preferably from 2.0 to 10.0 wt. % based on the weight of the intrinsically conductive organic polymer. Most preferably, one or all of the electrodes comprise poly(3,4-ethylenedioxythiophene)-poly(styrenesulfonate) doped with dimethylsulfoxide.

As used herein "electronic devices" may include one or more electronic components. The one or more electronic components may further include one or more thin-film components, which may be formed of one or more thin films. The term "thin film" refers to a layer of one or more materials formed to a thickness, such that surface properties of the one or more materials may be observed, and these properties may vary from bulk material properties. Thin films may additionally be referred to as component layers, and one or more component layers may comprise one or more layers of material, which may be referred to as material layers, for example. The one or more material or component layers may have electrical or chemical properties, such as conductivity, chemical interface properties, charge flow, or processability.

As used herein, "dielectric permittivity" refers to the ratio of the "absolute" permittivity (measure of flux formation per unit charge in the medium) ($\in$) to the permittivity of free space/vacuum ($\in_0$). It can also be called the "relative" dielectric permittivity.

As used herein, "dielectric loss," also called "loss tangent" or "dissipation factor," refers to the ratio of the imaginary part to the real part of the complex permitivities. The parameter presents how much the capacitor dissipates energy in form of heat or how "lossy" the material is for AC signals.

In general, the compositions and articles disclosed herein can alternatively comprise, consist of, or consist essentially of, any appropriate components herein disclosed. The compositions and articles can additionally, or alternatively, be formulated so as to be devoid, or substantially free, of any components, materials, ingredients, adjuvants or species used in the prior art compositions or that are otherwise not necessary to the achievement of the function and/or objectives of the present compositions.

All ranges disclosed herein are inclusive of the endpoints, and the endpoints are independently combinable with each other (e.g., ranges of "up to 25 wt. %, or, more preferably, 5 wt. % to 20 wt. %," is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." Reference throughout the specification to "one embodiment," "another embodiment", "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All references cited herein are incorporated by reference in their entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composite material comprising
a polymeric material; and
a hydrazine-reduced graphene oxide,
wherein the polymeric material is an organic relaxor ferroelectric material comprising a fluorinated polymer, a fluorinated copolymer, or a combination comprising at least one of the foregoing.

2. The composite material of claim 1, wherein the polymeric material comprises polyvinylidene fluoride, poly(vinylidene fluoride-co-trifluoroethylene), poly(vinylidenefluoride-co-trifluoroethylene-co-chlorofluoroethylene), or a combination comprising at least one of the foregoing.

3. The composite material of claim 1, wherein the weight ratio of the relaxor ferroelectric material to the hydrazine-reduced graphene oxide is 9:1 to 200:1.

4. The composite material of claim 1, wherein the polymeric material comprises a poly(vinylidenefluoride-co-trifluoroethylene-co-chlorofluoroethylene), and the weight ratio of the polymeric material to the hydrazine-reduced graphene oxide is 9:1 to 200:1.

5. A method of making a composite material comprising contacting a hydrazine-reduced graphene oxide with a relaxor ferroelectric material in the presence of a solvent, or contacting graphene oxide with a polymeric material in the presence of a solvent, then reducing graphene oxide with hydrazine.

6. A capacitor device comprising:
a substrate;
a first electrode disposed on the substrate;
a dielectric layer disposed on and in contact with the first electrode; and
a second electrode disposed on and in contact with the dielectric layer,
wherein the dielectric layer comprises the composite material of claim 1.

7. The capacitor device of claim 6, wherein the polymeric material comprises a fluorinated polymer, a fluorinated copolymer, or a combination comprising at least one of the foregoing, and the weight ratio of the polymeric material to the hydrazine-reduced graphene oxide in the composite materials is 9:1 to 200:1.

8. The capacitor device of claim 6, wherein the first electrode, the second electrode, or both are organic electrodes.

9. The capacitor device of claim 8, wherein the organic electrode comprises an intrinsically conductive organic polymer and a dopant in an amount effective to increase the electroconductivity of the intrinsically conductive organic polymer.

10. The capacitor device of claim 9, wherein the intrinsically conductive organic polymer is poly(phenylene), poly(naphthalene), poly(azulene), poly(fluorene), poly(pyrene) poly(pyrrole), poly(carbazole), poly(indole), poly(azepine), poly(aniline) poly(thiophene), poly(3,4-ethylenedioxythiophene), poly(p-phenylene-sulfide), poly(acetylene), poly(p-phenylene vinylene), copolymers of the foregoing polymers, or a combination comprising at least one of the foregoing polymers or copolymers, and the dopant is ethylene glycol, 2-butanone, dimethylsulfoxide, dimethylformamide, glycerol, sorbitol, hexamethylphosphoramide, or a combination comprising at least one of the foregoing dopants, and the dopant is present in an amount from 2.0 to 10.0 wt.% based on the weight of the intrinsically conductive organic polymer.

11. The capacitor device of claim 10, wherein the first and the second electrodes comprise poly(3,4-ethylenedioxythiophene)-poly(styrenesulfonate) doped with dimethylsulfoxide.

12. The capacitor device of claim 6, wherein the first and second electrodes and the dielectric layer each has a thickness of 1 nm to 20 micrometer.

13. The capacitor device of claim 6, wherein the device is a memory device, a capacitor, a transistor, or a diode.

14. A method of making a capacitor device, the method comprising:
disposing a first electrode on a substrate;
disposing a dielectric layer on the first electrode; and
disposing a second electrode on the dielectric layer,
wherein the dielectric layer comprises the composite material of claim 1.

15. The method of claim 14, wherein at least one of the first or second electrode is an organic electrode.

16. The method of claim 14, further comprising patterning the second electrode.

17. The method of claim 14, wherein the second electrode is ink-jet printed.

18. An electric component comprising an interconnect that electrically connects at least two elements of the electrical device, wherein the elements of the electrical device comprises or in contact with a dielectric layer comprising the composite material of claim 1.

19. The electric component of claim 18, wherein the interconnect comprises a doped electroconductive organic polymer, and wherein the doped electroconductive organic polymer comprises an intrinsically conductive organic polymer and a dopant in an amount effective to increase the electroconductivity of the intrinsically conductive organic polymer.

20. The electric component of claim 18, wherein the component is a memory device, a capacitor, a diode, or a transistor.

* * * * *